(12) United States Patent
Maciver et al.

(10) Patent No.: US 7,859,969 B2
(45) Date of Patent: Dec. 28, 2010

(54) RESILIENT DATA STORAGE ON OPTICAL MEDIA

(75) Inventors: Mark Alasdair Maciver, Renfrewshire (GB); James Keith MacKenzie, Ayrshire (GB)

(73) Assignee: International Business Machines Corporation, Armonk, NY (US)

( * ) Notice: Subject to any disclaimer, the term of this patent is extended or adjusted under 35 U.S.C. 154(b) by 715 days.

(21) Appl. No.: 11/533,389

(22) Filed: Sep. 20, 2006

(65) Prior Publication Data

US 2007/0073639 A1    Mar. 29, 2007

(30) Foreign Application Priority Data

Sep. 24, 2005    (GB) ................................. 0519556.5

(51) Int. Cl.
  *G11B 7/00* (2006.01)
(52) U.S. Cl. .................................. 369/59.25
(58) Field of Classification Search ........................ None
  See application file for complete search history.

(56) References Cited

U.S. PATENT DOCUMENTS

| 5,452,285 A | 9/1995 | Monen |
| 2006/0109764 A1* | 5/2006 | Fontijn ...................... 369/53.1 |

\* cited by examiner

*Primary Examiner*—Peter Vincent Agustin
(74) *Attorney, Agent, or Firm*—Steven Lieske Bennett

(57) ABSTRACT

A data resilience component ensures data integrity by storing a data file and a copy thereof in non-overlapping sectors along the spiral information track of an optical storage medium. The number and location of sectors of the optical storage medium are determined, and, in dependence on this data, the number and location of redundant data bits required to space the stored copy from the stored data file, such that the first sector containing the stored data file and the second sector containing the stored copy are non-adjacent, is determined. The data file, its copy and the redundant bits are then sent in a data stream in their appropriate location to prevent the files from being adjacent for recording.

16 Claims, 10 Drawing Sheets

RESILIENT DATA STORAGE ON OPTICAL MEDIA

BACKGROUND OF THE INVENTION

1. Field of the Invention

The invention relates to the field of data storage. In particular, the invention relates to the field of data storage on optical storage media.

2. Description of the Related Art

Storage media are often less reliable in the drive towards an optimal cost/performance balance at the low-end of the consumer spectrum. As storage becomes a commodity, poor manufacture and design often lead to long term reliability problems. Often, optical storage media cannot be read due to degradation of the data and hard disks are often more predisposed to corrupting data as the storage density increases. Higher storage densities and different material types are likely to increase long-term reliability issues.

It is well known that optical storage media should be capable of surviving damage to the physical disk, for example damage, such as, scratches and small holes. Optical storage media should also be able to recover data using robust and efficient Reed-Solomon and CRC codes. However, large parts of the optical storage medium can become unstable and may quickly overwhelm such methods hence resulting in the loss of data.

Traditional methods of archiving data do not protect loss of data if the only backup data is stored on the optical storage media. Thus if the optical storage media is damaged at the location the data file is stored, the data file can not be retrieved. Likewise, if two copies of data are stored on the optical storage medium at the same location and the optical storage medium becomes damaged, the data file are unable to be retrieved and hence both copies of the data are lost.

Thus there is a need for a new method of guarding against long term reliability issues and significant physical damage of the optical storage media.

SUMMARY OF THE INVENTION

Viewed from a first aspect the present invention provides a data resilience component comprising: a storing component for storing a data file at a first sector along a spiral information track of an optical storage medium; a creator component for creating a copy of the stored data file for storing at a second sector along the track, the first and second track sectors being non-adjacent; a determining component for determining the number of sectors of the optical storage medium and for calculating, in dependence on the number of sectors determined, the number of redundant data bits required to space the stored copy from the stored data file, such that the first sector containing the stored data file and the second sector containing the stored copy are non-adjacent.

The algorithm deployed by the data resilience component permits a data file to be stored within a given area defined by a controlled angular spread and across a defined radial distance. For example, one 10 MB data file may be stored in two separate locations on the outer parameter of the optical medium, each of which is bound within a 35 degree span and a radial distance of approximately 10 mm if only one sector is written on each revolution. This equates to an area of 10 mm by 38 mm. Additional files may be interleaved with the data sectors to eliminate wasted space. Additional redundant storage for twenty further data files may be interleaved within the same sector of a spiral track.

Thus, advantageously the present invention provides for a copy of a data file to be stored at an angular separated distance from the original data file. Redundant data is used to provide the correct amount of 'padding' to provide the angular separation of the data files. Thus if the optical disc medium is damaged the present invention will attempt to retrieve the original data file and the copy of the data file for viewing. If either the original data file or the copy of the data file is damaged the data may be retrieved from the copy of the data file or the original data file which ever is determined as damaged.

Preferably, the present invention provides a data resilience component wherein, the output of the calculation component comprises a data stream comprising the data file, the copy of the data file and the redundant data bits for transmitting to an optical storage device for writing to the optical disc medium.

Preferably, the present invention provides a data resilience component wherein the data file and the copy of the data file are separated by at least one sector.

Preferably, the present invention provides a data resilience component wherein the data file and the copy of the data file are racially opposed to each other.

Preferably, the present invention provides a data resilience component wherein the calculation component calculates the number of sectors, through a complete revolution of the spiral information track, which can store the data file and the copy of the data file without overlapping sectors.

Preferably, the present invention provides a data resilience component comprising a retrieval component for retrieving the data file, the copy of the data and the redundant data bits from the optical storage medium.

Preferably, the present invention provides a data resilience component wherein the retrieval component further comprises extracting the data file and the copy of the data file from the optical storage medium and determining if the data file and/or the copy of the data file is operable.

Preferably, the present invention provides a data resilience component wherein the data resilience component further determines whether the data file and the copy of the data file are error free and can be accessed by a requesting application.

Viewed from a second aspect the present invention provides a data resilience method comprising: storing a data file at a first sector along a spiral information track of an optical storage medium; creating a copy of the stored data file for storing at a second sector along the track, the first and second track sectors being non-adjacent; determining the number of sectors of the optical storage medium; and calculating, in dependence on the number of sectors determined, the number of redundant data bits required to space the stored copy from the stored data file, such that, the first sector containing the stored data file and the second sector containing the stored copy are non-adjacent.

Viewed from a third aspect the present invention provides a computer program product loadable into the internal memory of a digital computer, comprising software code portions for performing, when said product is run on a computer, to carry out the invention as described above.

BRIEF DESCRIPTION OF THE DRAWINGS

Embodiments of the invention are described below in detail, by way of example only, with reference to the accompanying drawings in which.

DESCRIPTION OF THE PREFERRED EMBODIMENT

Figure 1:
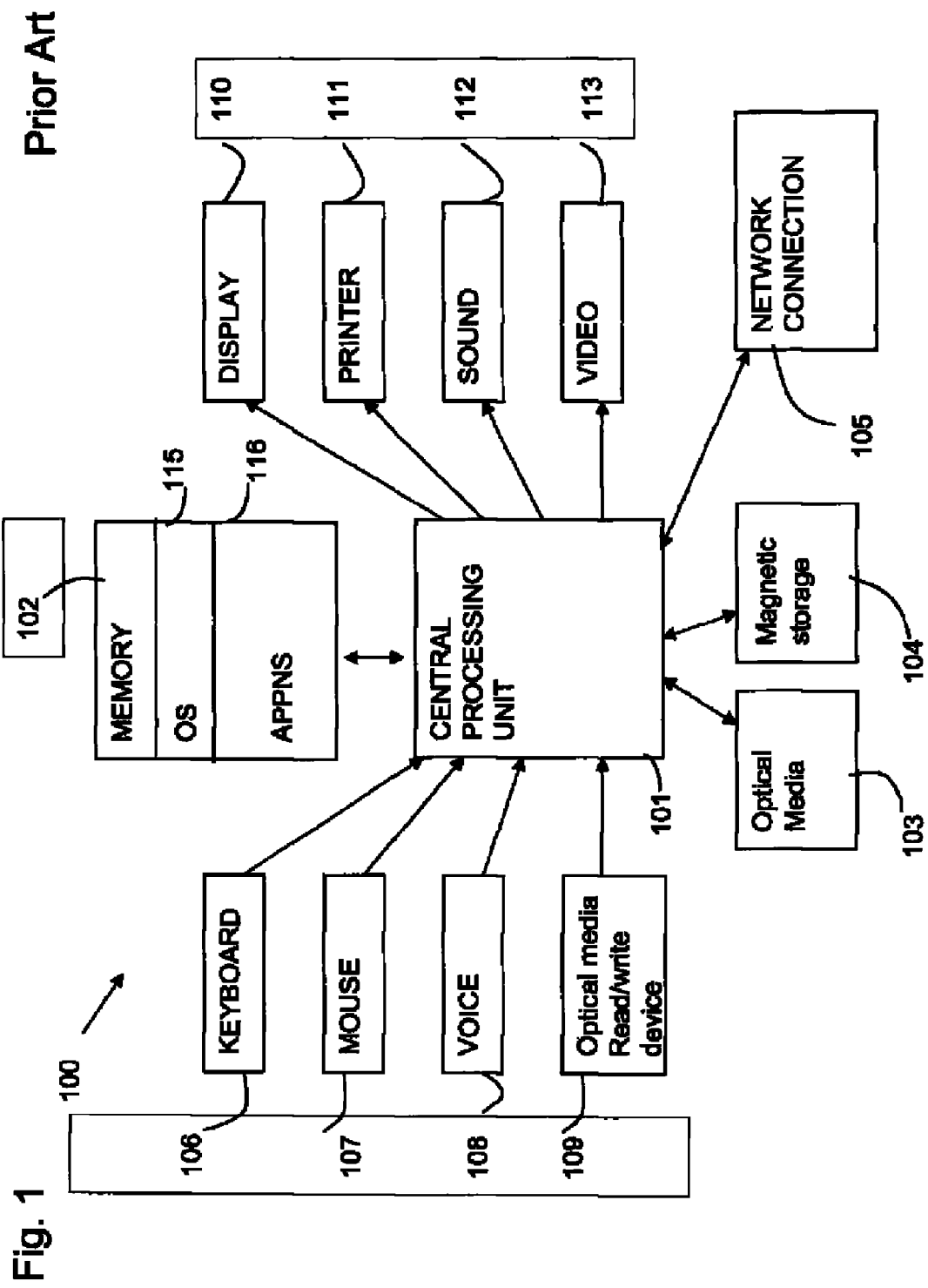
FIG. 1 is a schematic block diagram showing a computer system in accordance with a preferred embodiment of the present invention.

Referring to FIG. 1, a computer system 100 is shown on which a preferred embodiment of the present invention may be implemented. A computer system 100 has a central processing unit 101 with primary storage in the form of memory 102 (RAM and ROM). The memory 102 stores program information and data acted on or created by the programs. The program information includes the operating system code 115 for the computer system 100 and application code 116 for applications running on the computer system 100. Secondary storage includes optical storage medium 103 and magnetic disk storage 104. Data and program information can also be stored and accessed from the secondary storage. In order to write data to an optical disc medium 103 the computer system 100 may also comprise an optical disc read/writer 109. The optical disc read/writer 109 may be installed externally to the computer system 100 and be connected via a SCSI interface or a USB interface. Alternatively, the optical disc read/writer 109 may be installed internally within the computer system 100 and interface with the computer system 100 via an IDE system bus.

The computer system 100 includes a network connection means 105 for interfacing the computer system 100 to a network, such as, a local area network (LAN) or the Internet. Data may be accessed via the network connections means 105 and written to an optical storage medium 103 or magnetic storage medium 104 for back up purposes etc.

The central processing unit 101 comprises inputs in the form of, as examples, a keyboard 106, a mouse 107, voice input 108, and a scanner 109 for inputting text, images, graphics or the like. Outputs from the central processing unit 100 may include a display means 110, a printer 111, sound output 112, video output 113, etc.

The storage means, as previously discussed, may comprise optical storage medium 103. The optical storage medium 103 may be in the form of a CD ROM, DVD, laser disc and/or magneto optical discs etc.

Figure 2:
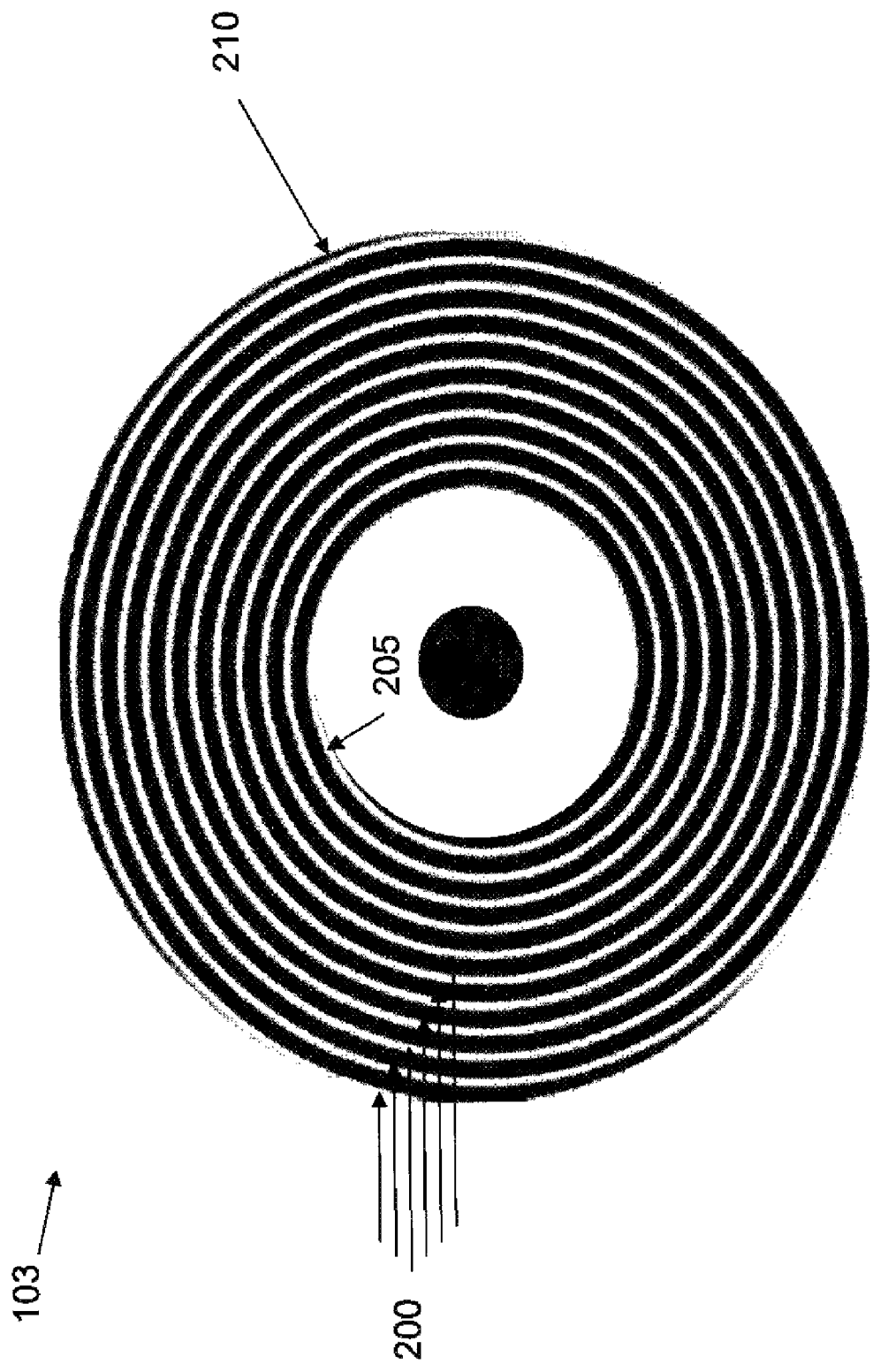
FIG. 2 illustrates a schematic representation of an optical storage medium as is known in the art.

Referring to FIG. 2, an optical disc 103 is shown. An optical disc 103 can be characterized as a flat circular disc, usually manufactured from polycarbonate, whereon data can be stored. The stored data is generally accessed when a material, such as, aluminum is illuminated with a laser diode.

Data is stored sequentially on a continuous spiral track 200 of the optical storage disc 103. Data is stored along the spiral track 200 starting from the innermost track 205 and finishing at the outermost track 210. Each optical storage disc 103 comprises some form of an addressing scheme in order for a read/write mechanism to determine the location of stored data or to determine the location of where to store data. The type of addressing scheme deployed is dependent on the optical storage medium. For example, a sub code addressing scheme is used by CD-Audio, CD-I and CD-ROM and a sector addressing scheme is used by CD-ROM and DVD-ROM. Other examples of addressing schemes include Wobble, Pre-Groove and Land Pre-Pits.

As already explained an optical storage disc 103 comprises a spiral track 200 along which data is stored, the spiral track 200 is known in mathematical terms as an Archimedes spiral because the spiral increases in diameter linearly with increasing radius 205 to 210. The interval between turns of the spiral track 200 is called the track pitch and this is normally constant for most optical disc formats 103.

Figure 3:
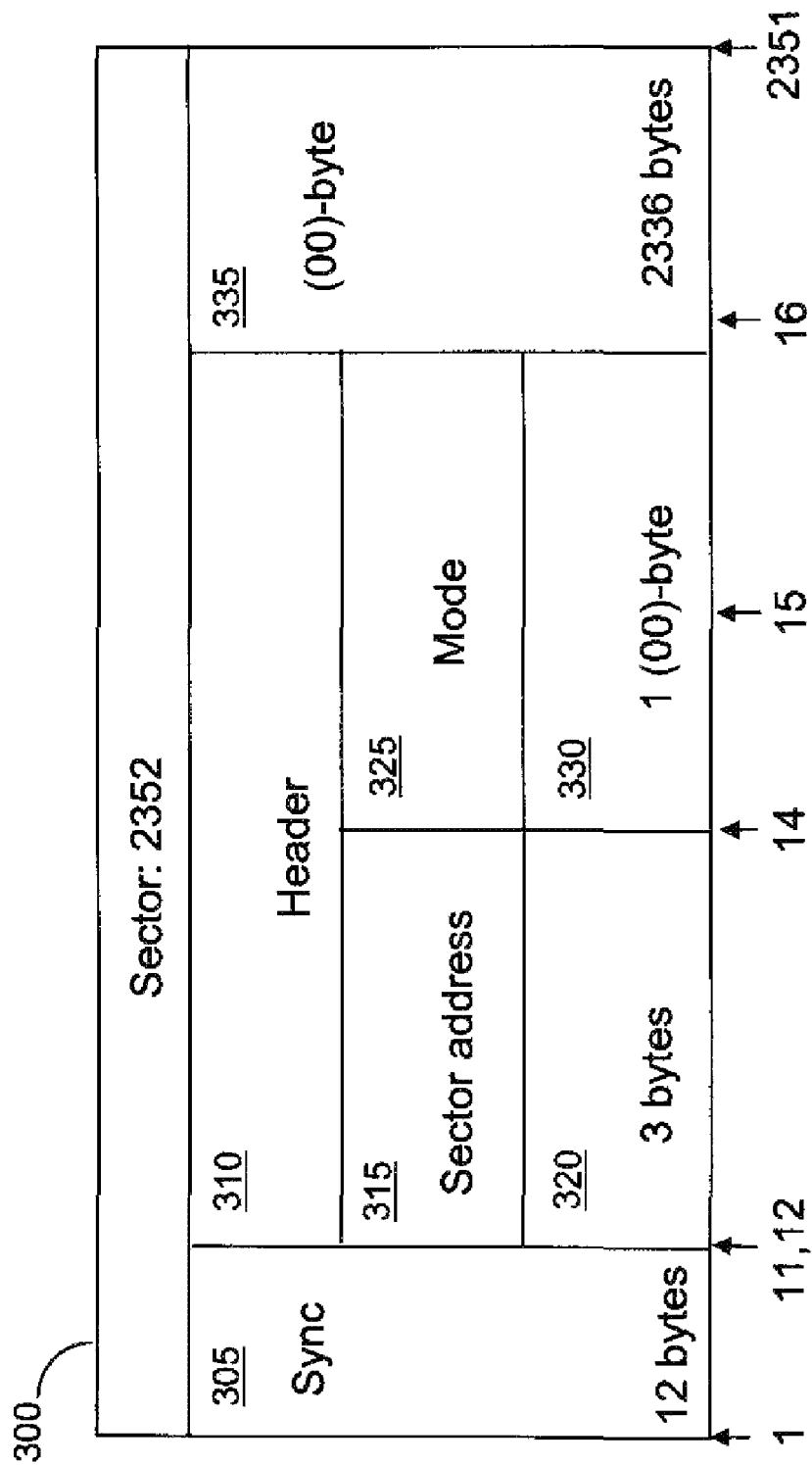
FIG. 3 illustrates a block diagram of a sector mode (Sector Mode (00)) as is known in the art.

The data to be recorded in an information track is represented by 8-bit bytes and grouped into sectors. A sector is the smallest addressable part of the information area that can be accessed independently. A sector, typically, comprises 2352 bytes of information and has a layout similar to the layout as shown in FIG. 3. The layout does depend on the setting of the sector mode byte. In FIG. 3 the byte positions are numbered starting with zero. Position zero corresponds to the first byte of a sector 300. A sector 300 is made up of a sync field 305, a header field 310, a sector address filed 315, a mode field 325 and a data field 330. For more information about each of the fields and sector addressing in general, please refer to the Standard ECMA—data interchange on read-only 120 mm optical data disks, $2^{nd}$ Edition, June 1996.

Figure 4:
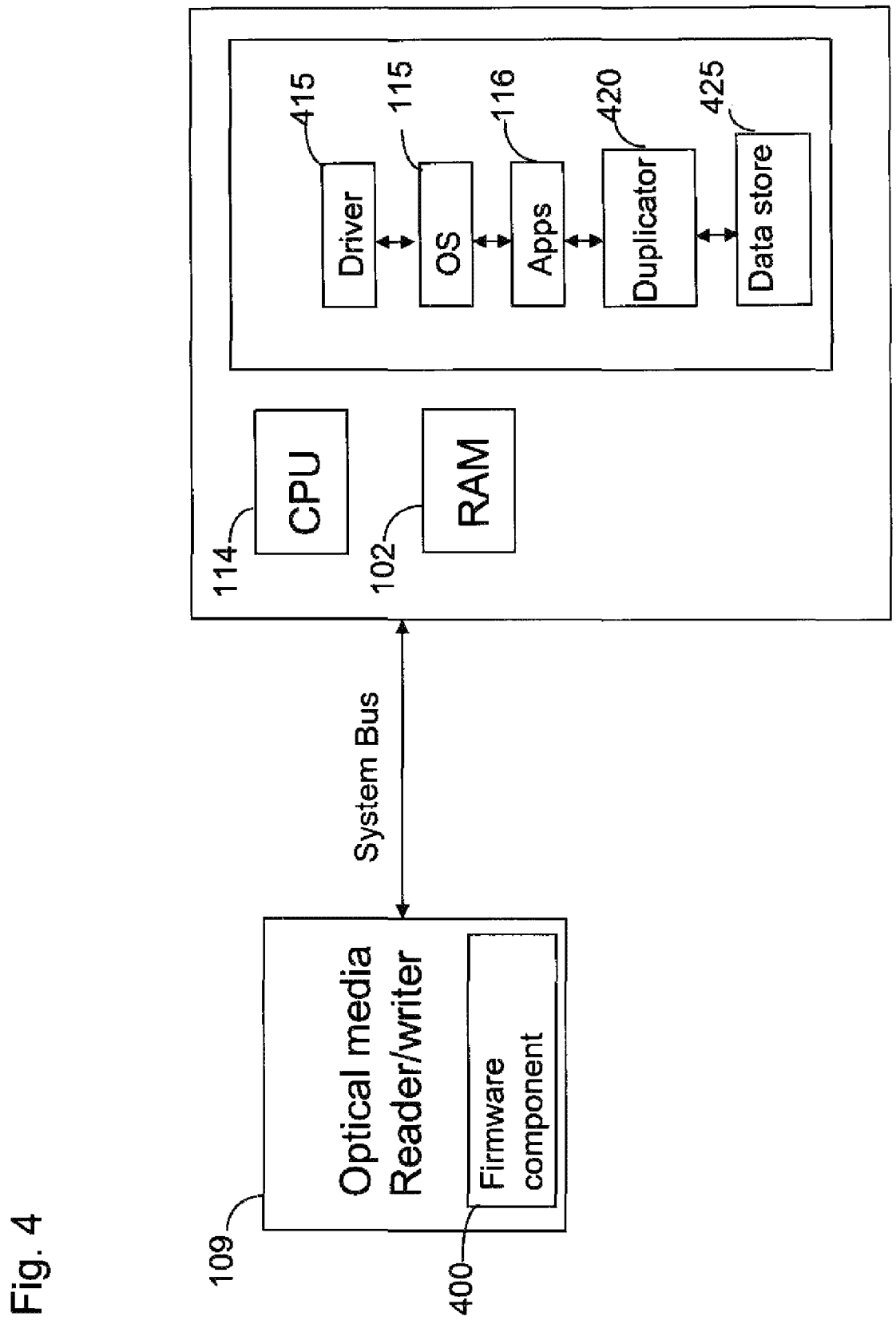
FIG. 4 illustrates a further embodiment of a computer system in which the present invention may be embodied, in accordance with a preferred embodiment of the present invention.

Moving onto FIG. 4, the components of the invention are shown as embodied in the computer system 100 of FIG. 1. In a preferred embodiment the present invention provides a data resilience component 420 for storing a duplicate data file on a separate physical location of the optical storage medium 103. The data resilience component 420 modifies and extends the capabilities of current read/write applications for optical storage medium 103. The data resilience component 420 may be installed as an add-on component to existing read/write applications or as a standalone application. If the data resilience component 420 is installed as an add-on component changes to the graphical user interface of the read/write application are made in order to provide menu access to the functionality of the data resilience component 420.

The data resilience component 420 receives and requests information from the read/write application in order to determine which data files are already stored on the optical disc medium 200 and at which location along the information track the data files are stored. The read/write application also transmits to the data resilience component 420 information, such as, which data files have been selected by a user to be stored and duplicated for storage to a second separate non-adjacent physical location of the optical storage. In one embodiment any data file that is selected for storage may be duplicated and separately stored by the data resilience component 420. In another embodiment a user may firstly select which data files are to be stored and secondly which of the selected data files should be duplicated on a separate physical location of the optical disc medium. Further modifications, configurable by a user, may comprise storing files of a particular file type or extension and not storing others. For example storing all .doc files but not .exe files etc.

In a stand-alone implementation the data resilience component 420 combines the existing functionality of read/write applications with the additional functionality of duplicating the selected data files to a separate physical location on the optical storage medium 103. The data resilience component 420 provides a graphical user interface in order to allow a user to select the data files to be stored and the data files to be duplicated.

In either implementation the duplicated data files may be viewed via a viewing interface of the data resilience component 420. Alternatively, the duplicated files may be password protected and only available for viewing by the holder of the password.

The data resilience component 420 in a stand-alone implementation also interacts with the operating system which in-turn interacts with a driver component 415 for communication with the optical medium reader/writer hardware 109.

The optical medium reader/writer 109 communicates with the data resilience component 420 via a system bus. The optical medium reader/writer 109 comprises a firmware component 400 which monitors the status of the optical storage medium when it is being written to or read from. The firmware component 400 transmits information to the driver component 415 when requested by the read/write application. The driver component 415 comprises information, such as the different data interchange standards for different optical storage medium 103 and the appropriate addressing scheme to be used with a particular data interchange format.

Figure 5:
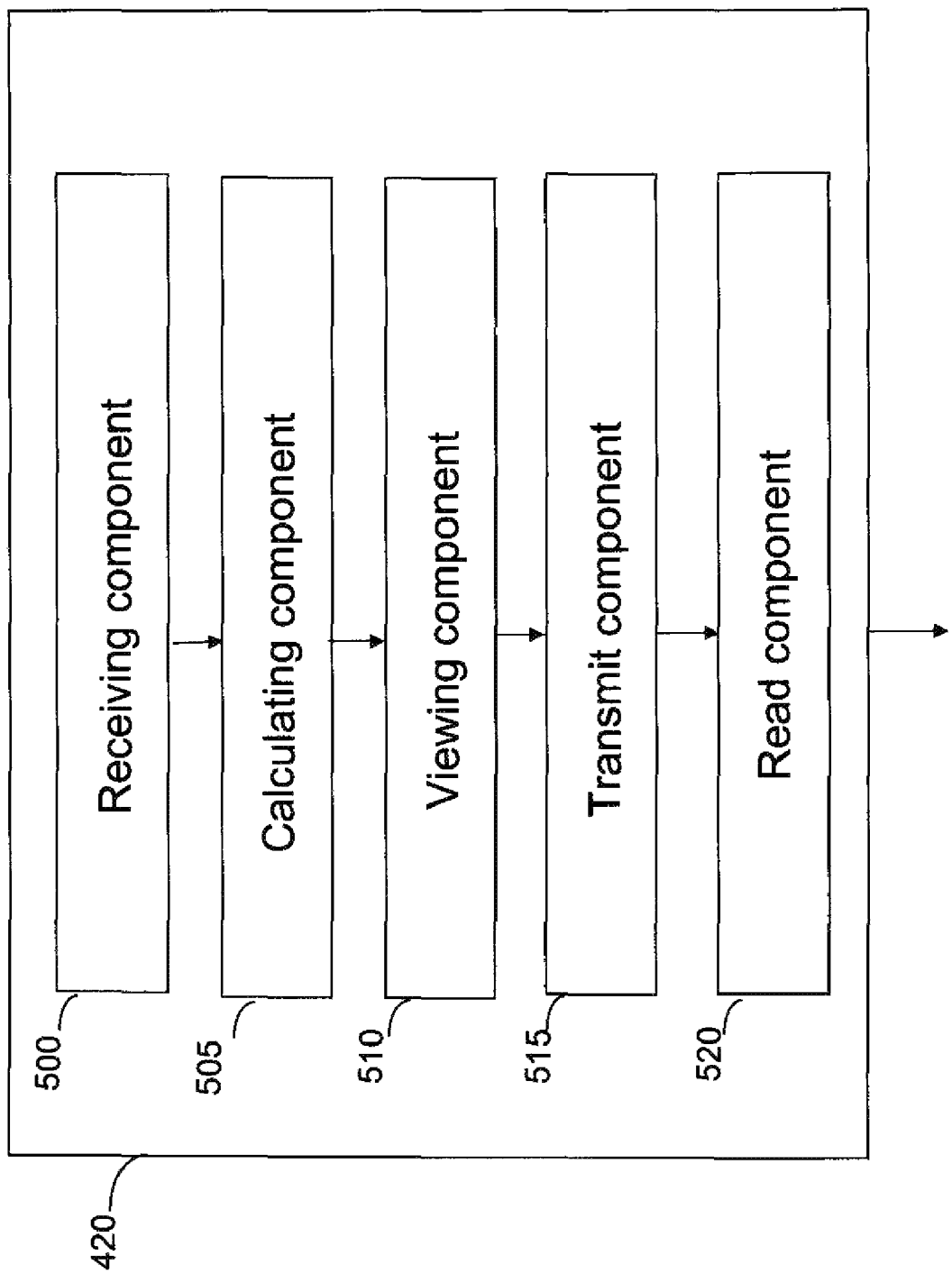
FIG. 5 illustrates the data resilience component in accordance with a preferred embodiment of the present invention.

FIG. 5 shows the components of the data resilience component 420 in further detail. The data resilience component 420 comprises a receiving component 500, a calculating component 505, a viewing component 510, a transmitting component 515 and a read component 520. The functionality of each of the components will be explained in turn.

The receiving component 500 receives instructions from the read/write application or directly via an input interface (not shown). The instruction informs the receiving component 500 to begin the duplication process. The instruction further comprises data pertaining to which data files are to be duplicated, the current location of the data files, the type of optical storage medium 103 the data is to be written to, the amount of data already stored on the optical storage medium 103 and the remaining storage capacity of the optical storage medium 103.

On receipt of an instruction, the receiving component 500 transmits the data to the calculating component 505 for processing.

The calculating component 505, using the angular geometry of the optical medium, calculates the storage location of the selected data file and the storage location of the duplicate data file. Redundant data is used as padding between data blocks of the selected data and data blocks of the duplicate data to provide the appropriate angular separation of the selected data and the duplicate data. This ensures the duplicate data is mirrored to a different sector of the optical storage medium 103. The output of the calculating component 505 includes the new composite data file.

The transmitting component 515 receives the new composite data file from the calculations component 505 and transmits the composite data file to the firmware component 400 for processing. Further, if the firmware component 400 generates an error message when processing the composite data file, the error message is transmitted to the transmitting 515 component for passing back to the calculations component 505 for processing.

The viewing component 510 provides a graphical user interface for viewing the data files once stored on the optical storage medium 103, such that, a user is able to select data files to be retrieved.

The read component 520 receives inputs from the viewing component 510, for example, to retrieve a particular data file from the optical storage medium. The read component also receives feedback from the firmware component 400, for example, feedback pertaining to data files unable to be read because of surface damage to the optical disc medium 103. In this instance, if the data selected by the user is unable to be retrieved, the read component 520 locates the duplicate data and retrieves the duplicate data instead of the original data file.

In order to understand how the invention works the function of the calculation component is explained in detail.

Figure 6:
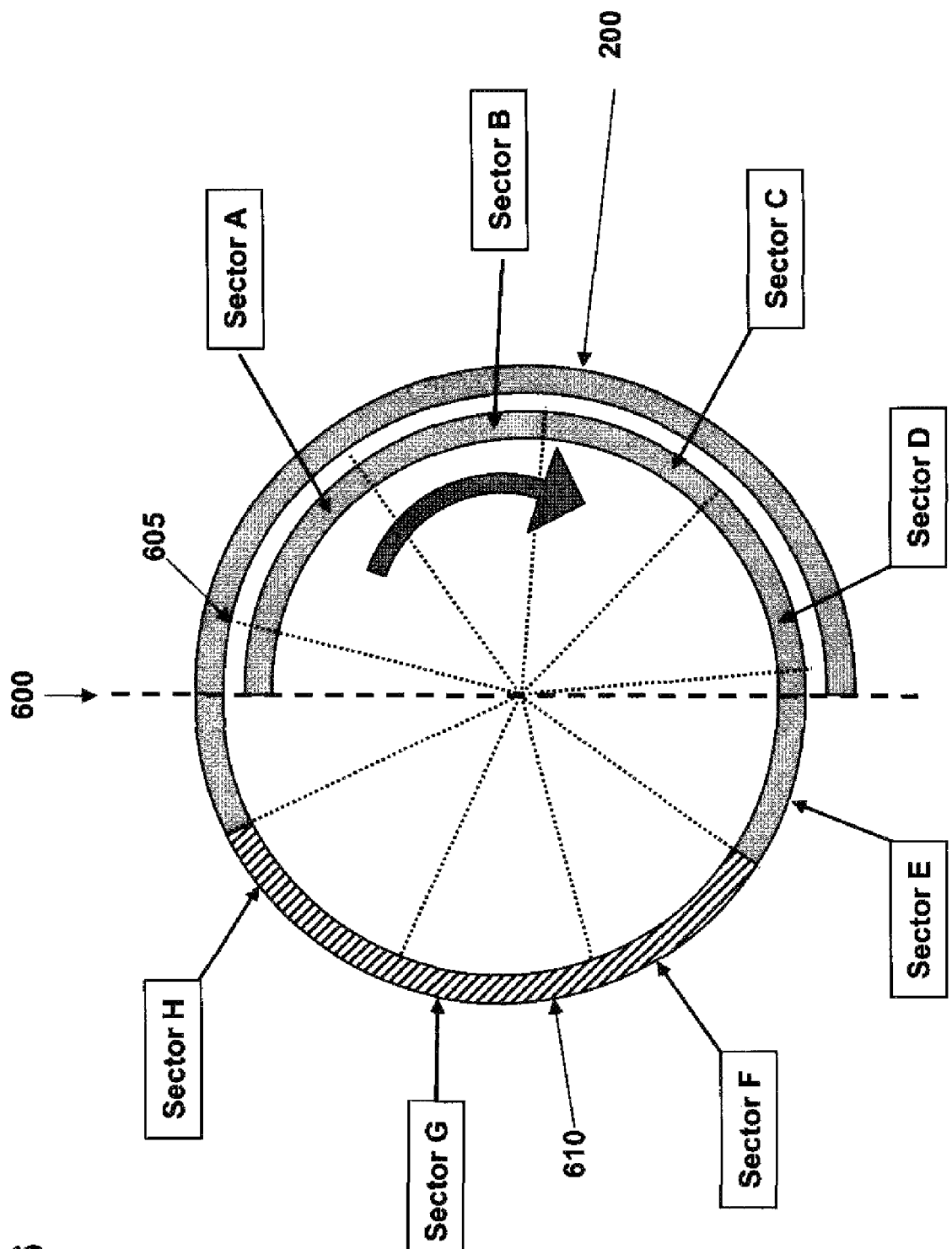
FIG. 6 illustrates sectors of an optical disc of FIG. 2.

As previously explained, the calculation component 505 uses the angular geometry of the optical storage medium 103 to calculate the location at which to store a data file and at which location a copy of the data file should be mirrored to in order to achieve angular separation of both data files. FIG. 6 illustrates an optical disc 103. As is shown the optical disc 103 is divided into sectors—sector A, sector B, sector C, sector D, sector E, sector F, sector G, sector H and sector I. Each sector is a segment of 40 degrees and each sector comprises 2352 bytes. Thus, the optical disc can be divided into nine sectors of equal size.

Each of these nine sectors can be used for the storage of data, but in order to provide angular separation of the data not all nine sectors are available. This is illustrated by drawing a hypothetical line 600 through the axis of the optical storage medium 103. The line divides the optical storage medium 103 into two 180 degree segments—each side mirroring the other side. As shown, the line 600 passes through sectors I and sectors E. If physical separation is to be achieved by mirroring data too physically separate sectors—sectors I and sectors E can not be used as these sectors overlap both halves of the optical disc. Thus, only sector F, sector G and sector H are available to mirror data contained in the four non-overlapping sectors in the other half of the medium—i.e. sector A, sector B, sector C and sector D. Any additional data that is not mirrored on the first revolution of the spiral information track will need to be mirrored on another revolution.

The physical structure of the optical storage medium 103 is such that data may be stored across most of the surface area—from a diameter of 50 mm to 116 mm. Data is firstly mapped into sectors and then scrambled into F1 Frames, F2 Frames with added parity bits and then finally F3 Frames before writing the data to the optical disc medium 103. For further information concerning encoding method of data before the data is written to the optical disc medium can be found by referring to ECMA-130, Data Interchange on Read-only 120 mm Optical Data Disks (CD-ROM), 2nd edition (June 1996).

In order to mirror the data from one sector to another the angular data storage area of the optical storage medium is determined. The perimeter of the information track 200 varies with the radius of the information track 200 and thus with the data stored on the information track. The linear recording velocity remains constant across the information track 200 and therefore. The lowest number of sectors per revolution occurs at the inner limit of the data area (50 mm diameter) and at the highest linear velocity. Therefore the data is written at the rate of more than 9 sectors per revolution.

The following table illustrates the nominal number of sectors per revolution at the inner and outer perimeters.

TABLE 1

| Boundary conditions | Sector linear length | Sectors per revolution | Angle subtended per data sector |
|---|---|---|---|
| Inner diameter 50 mm (perimeter 157 mm) | 17.3 mm | 9.1 | 39.6 degrees |
| Outer diameter 116 mm (perimeter 364 mm) | 17.3 mm | 21.0 | 17.1 degrees |

Each revolution therefore comprises a minimum of nine sectors of data. Allowing for overlap there will be no fewer than three complete sectors in any one half of the disc surface. Only one sector is required to be present in each of two separate and non-overlapping parts of the physical medium for this invention to operate in a preferred embodiment.

The position of the start of each sector is stored during the record process and is independent of the write speed. Therefore the calculation component 505 is able to calculate the start position of each sector, along the track, using the logical block number of each sector and the linear track velocity.

Thus, the calculation component 505 calculates that for two sectors on the inner perimeter of the track (diameter 50 mm), the two sectors will be separated by a nominal 180 degrees if there are four intervening sectors. On the outer perimeter, the same angular separation is achieved if there are ten intervening sectors.

In order to store and duplicate data to a separate physical location, the data must be processed. The processing comprises taking a copy of the data selected for duplication and packaging it into a contiguous data file. The contiguous data file comprises the selected data, a copy of the selected data and redundant data bits. Redundant data bits are required to provide enough padding between the selected data and the duplicate data to ensure the duplicate data is stored in a separate sector of the optical storage medium 103. In order to process the selected data into a contiguous data file the calculation component 505 must first divide the selected data into smaller data blocks, the data blocks must be duplicated and the appropriate number of redundant data blocks added.

Figure 7:
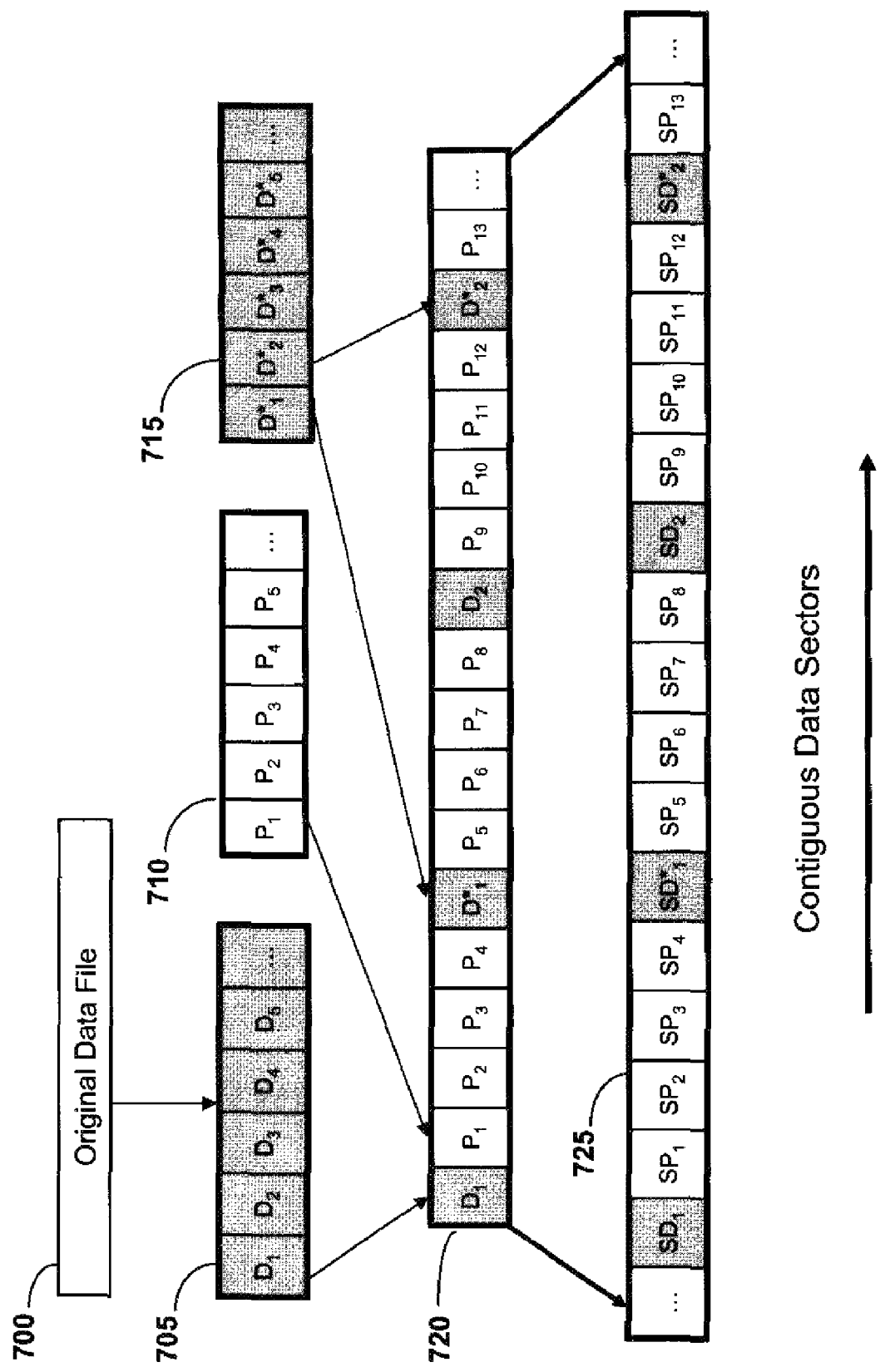
FIG. 7 is a block diagram illustrating a data file, a duplicate data file and padding data being packaged into a contiguous data file.

FIG. 7 shows a graphical representation of user selected data being packaged into a contiguous data file for transferring to the optical disc medium. A user selects a data file 700 for duplicating and storing on the optical storage medium. The data file is divided into a number of data blocks 705. The number of data blocks the data file is divided into is dependent on the size of the data file. As shown, the original data file 700 is divided into data blocks D1, D2, D3, D4, D5 and so on. A copy 715 of each of the data blocks is derived, i.e. D*1, D*2, D*3, D*4, D*5, etc. Next the amount of redundant data 710 required is calculated, for example, P1, P2, P3, P4, P5, in order to achieve the correct angular separation.

The calculation component 505 takes each of the data blocks and packages the data blocks into a data file 720 for transmission to the optical medium reader/write device 109. The firmware component 400 on receipt of the data file 720 formats the data file 720 into sectors for writing to the optical storage medium 103, as shown by formatted data file 725.

Figure 8:
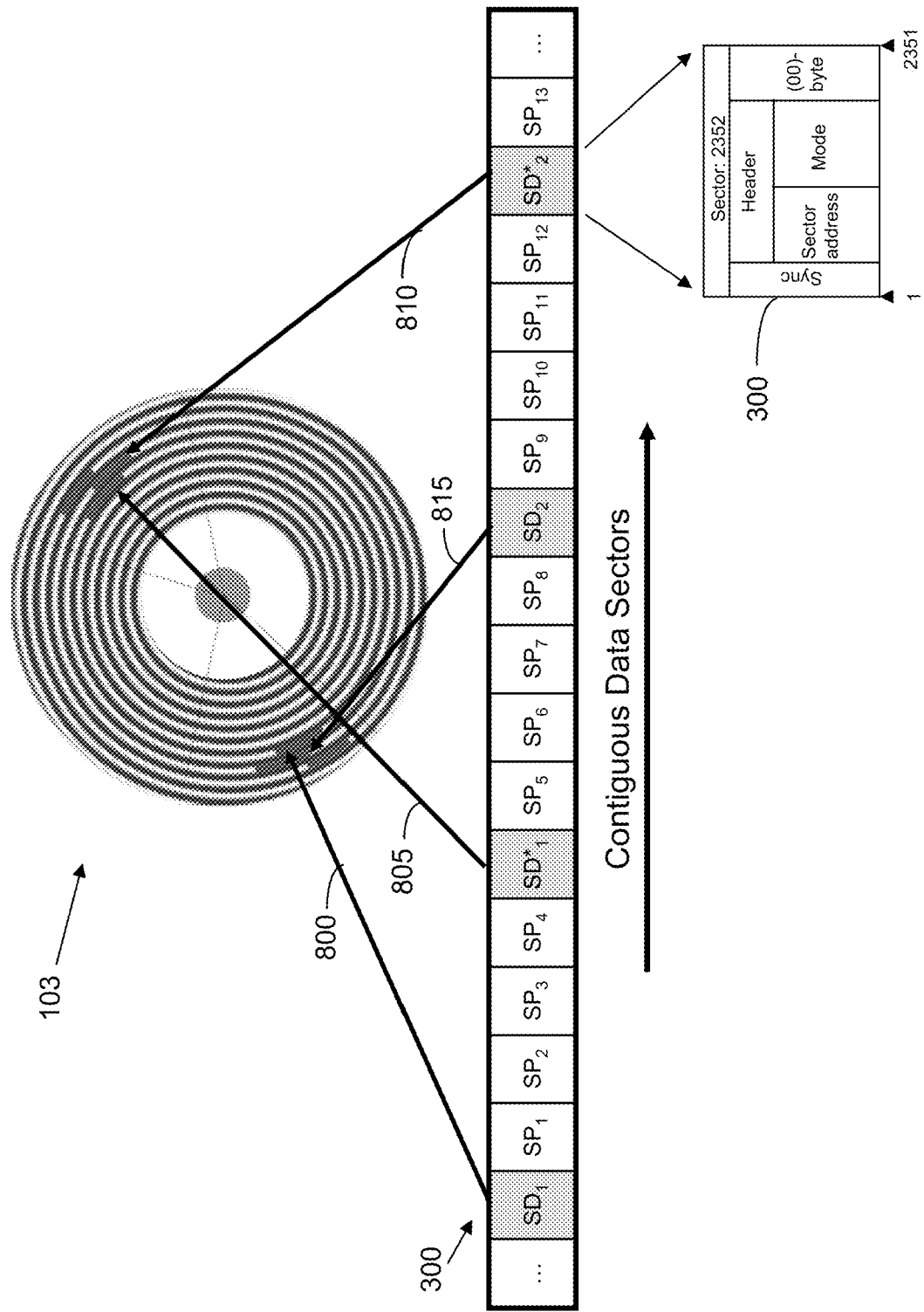
FIG. 8 illustrates a linear representation of data stored on a spiral track of the optical medium of FIG. 2, in accordance with a preferred embodiment of the present invention.

FIG. 8 illustrates the information track of the optical storage medium 103 once written with the contiguous data file. As is shown sector SD1 is written to the information track at point 800. A copy of the sector SD1 (SD*1) is mirrored within the optical storage medium at point 805. Sector SD2 is written on the information track 200 at point 815 and a copy of the sector is mirrored on the optical storage medium 103 at point 810. The redundant data is stored along the information track 200 between points 800 and 805 and points 815 and 810.

For example, as previously explained the derived contiguous data file 720 is modified into data sectors, each of which contains 2,336 8-bit bytes of user data, a 4 Kb data file would normally be divided into two sectors and stored on the optical storage medium 103. The two sectors are mapped by the optical storage device 109 into Channel frames for physical storage as described by ECMA 130. Groups of Channel frames correspond to data sectors. For example, taking a 4 Kb data file as follows:

1 kb=1024 bytes, and 4 kb=4096 bytes

Therefore, 4 kb of user data corresponds to two sectors containing data partitioned as:

$$4096 \text{ bytes} = 2336(\text{Sector 1 data}) + 1760(\text{Sector 2 data}) + 576(\text{Sector 2 null}) \text{bytes}.$$

The start position along a spiral track is a direct function of the data stored prior to the start of any given file.

Table 1 indicates the number of complete sectors that may be stored on any given spiral segment at the two extremes of the data area. From Table 1, the number of sectors, Ns, which form one complete revolution of the optical storage medium 103 can then be described as $$Ns = 9.1 \text{ sectors} + (D(\text{stored})/D(\text{capacity})) * (21 - 9.1),$$

where D(stored) is the data stored in the data area, and D(capacity) is the data capacity of the optical storage medium 103.

Also, the integer number of consecutive sectors, Nc, that can be stored on any one arbitrary half of a disc may be described thus:

$$Nc = \text{Int}(Ns/2 - 1), \text{ and } Nc >= 3 \text{ where } Ns > 9.$$

As at least three sectors can be stored consecutively on one half-revolution, there is no need to store additional sectors on a second revolution and at any radius along the medium. The two sectors containing data bytes may thus be stored in adjacent positions for this example.

The number of padding sectors needs to be calculated to ensure that the next copy of the data is physically separated from the first copy.

For this example, assume that 25% of the optical disc medium has already been filled with data. Using the formula described above, $$Ns = 9.1 \text{ sectors} + (D(\text{stored})/D(\text{capacity})) * (21 - 9.1)$$

Ns=12.075

Ns/2=6.04 Sectors per half-disc.

With two of the six sectors on each half used to store user data, the two data copies must be separated by four sectors to achieve the desired symmetry. This is illustrated in Table 2 below.

TABLE 2

| | Sector | | | | | | | | | | | | |
|---|---|---|---|---|---|---|---|---|---|---|---|---|---|
| | 1 | 2 | 3 | 4 | 5 | 6 | 7 | 8 | 9 | 10 | 11 | 12 | End |
| Bytes: | 2336 | 1760 + 576 | 2336 | 2336 | 2336 | 2336 | 2336 | 1760 + 576 | 2336 | 2336 | 2336 | 2336 | |
| Comment | Data Copy 1 | Data Copy 1 + null | Pad | Pad | Pad | Pad | Data Copy 2 | Data Copy 2 + null | Pad | Pad | Pad | Pad | |

Using the above example, 8×2,336 bytes of data (18.25 kb) have been inserted to provide physical separation for a 4 Kb file and its replica. The total file size is 22.25 Kb and this new data file is sent to the optical storage medium 103 for storage in the file system in the same way as any other data file.

Although the calculation component is explained with reference to the example above, it should be obvious to a person skilled in the art other forms of angular separation may be achieved. For example, a data file and its copy may be separated by one single sector or more etc.

Figure 9:
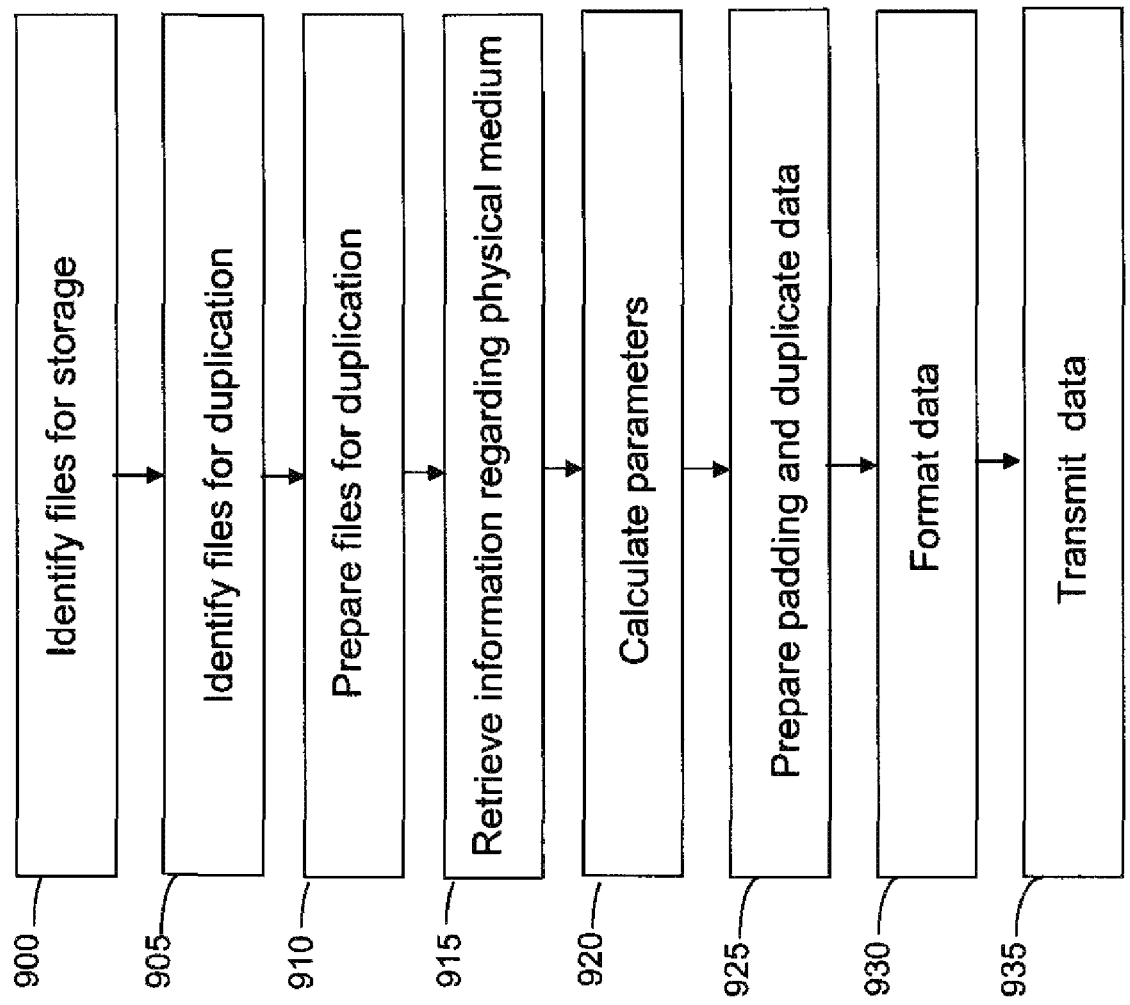
FIG. 9 illustrates the operational steps of the data resilience component when storing data on the optical medium in accordance with a preferred embodiment.

FIG. 9 illustrates a preferred embodiment of the invention in use. At Step 900, the user identifies the files for storage on an optical storage medium 103. The user, at Step 905, selects from the selected data files which data files are to be duplicated. An instruction to commence the duplication process is transmitted to the receiving component 500.

At Step 910, the receiving component 500 transmits the received instruction to the calculation component 505 for processing and the calculation component 505 prepares the selected data files for duplication. The calculation component 505 request information from the firmware component 400, for example, information regarding the format of the optical storage medium 103, the volume of data already stored on the optical storage medium 103 and at which location along the information track 200 the data is stored. On receipt of this information the calculation component 505 begins to calculate the duplications parameters.

Based on the calculated parameters, at Step 925, the calculation component 505 calculates the amount of redundant data required to separate the selected data from the duplicated data. The amount of data encoded within each sector is dependent upon the exact optical storage medium (CD or DVD) standard employed. However, the number of padding bytes would be calculated to provide a predetermined physical separation between the two copies of data. The offset (i.e. number of dummy sectors) is variable depending upon the radial location of the data along the information track as there are more sectors per revolution on the outside perimeter.

At Step 930, the selected data, the redundant data and the duplicated data is formatted into a contiguous data file 720. The contiguous data file 720 is transmitted to the firmware component 400 to be processed by the optical read/write device 109 at Step 935.

Figure 10:
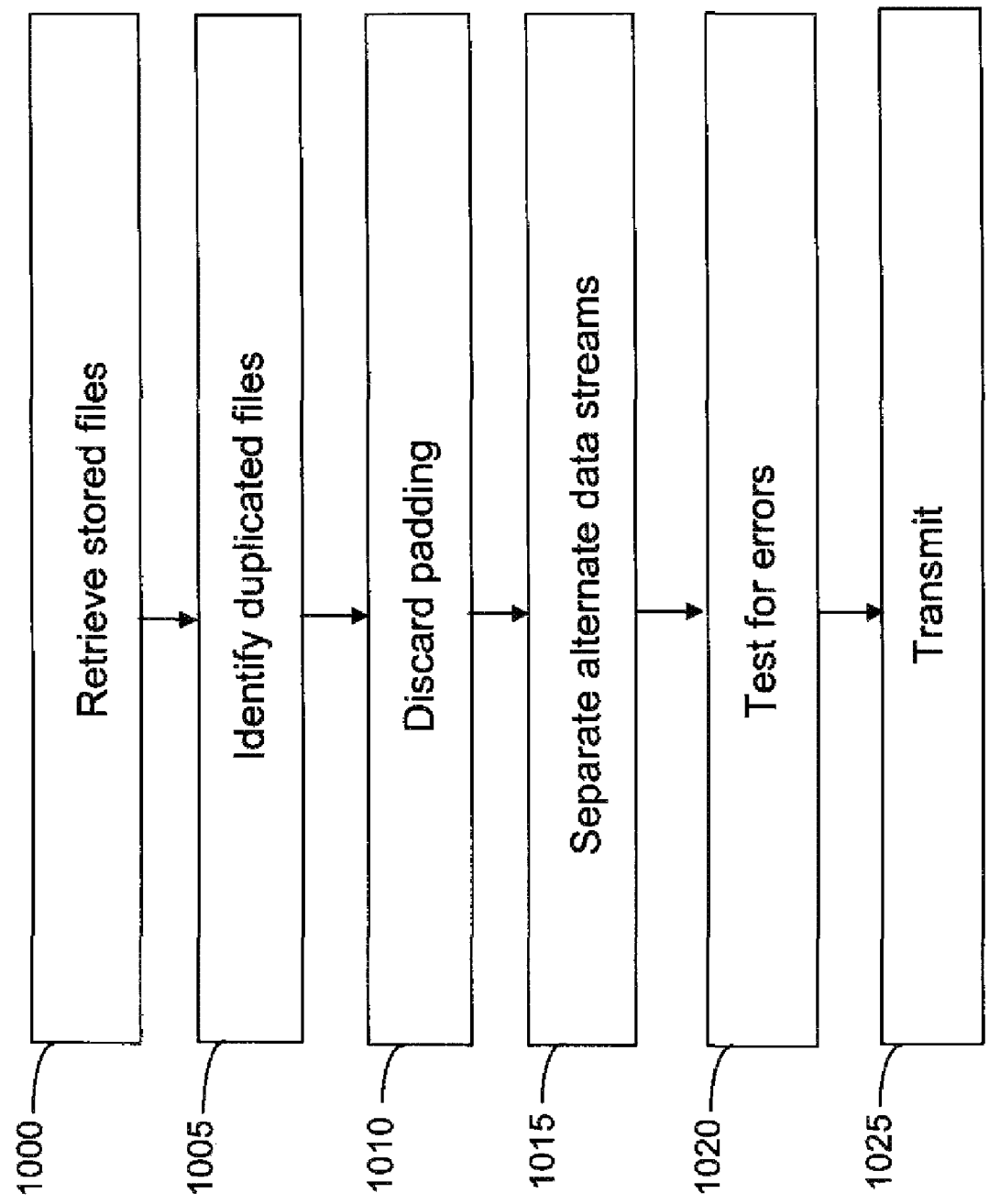
FIG. 10 illustrates the operational steps of the data resilience component when reading data stored on the optical medium by the data resilience component, in accordance with a preferred embodiment of the present invention.

FIG. 10 illustrates the operation steps of the read component 520. At Step 1000, the read component 520 retrieves the selected data files as requested by the read/write application. The selected data files are retrieved within the contiguous data file 720. At Step 1005, the duplicate data files are identified and at Step 1010 the redundant data bits are located and disregarded. At Step 1015, the read component 520, separates the original data file 700 and the duplicate data file 715 into separate data streams. At Step 1020, the read component tests each of the data files for any errors using standard error checking techniques and sends the data files to the viewing component for viewing.

The invention claimed is:

1. A data resilience component comprising:
a storing component for storing a data file at a first sector along a spiral information track of an optical storage medium having a first half and a second half, the first half and the second half being non-overlapping;
a creator component for creating a copy of the data file for storing at a second sector along the spiral information track, the first and second track sectors being non-adjacent; and
a determining component for determining a number of sectors of the optical storage medium and for calculating, in dependence on the number of sectors determined, a number and location of redundant data bits required to space the copy of the data file from the data file, such that the first sector containing the data file and the second sector containing the copy are non-adjacent and radially opposed to each other on the optical storage medium in that the first sector is located on the first half of the optical storage medium and the second sector is located on the second half of the optical storage medium.

2. A data resilience component as claimed in claim 1, wherein said determining component outputs a data stream comprising the data file, the copy of the data file and the redundant data bits for transmitting to an optical storage device for writing to the optical storage medium.

3. A data resilience component as claimed in claim 1, wherein the data file and the copy of the data file are separated by at least one sector on the optical storage medium when stored on the optical storage medium.

4. A data resilience component as claimed in claim 1, wherein said determining component determines which sectors of the spiral information track which can store the data file and the copy of the data file without overlapping sectors.

5. A data resilience component as claimed in claim 1, further comprises a retrieval component for retrieving the stored data file, the stored copy of the data and the redundant data bits from the optical storage medium.

6. A data resilience component as claimed in claim 5, wherein the retrieval component further comprises extracting the stored data file and the copy of the data file from the optical storage medium and determining if the data file and/or the copy of the data file is operable.

7. A data resilience component as claimed in claim 6, wherein the data resilience component further determines whether the stored data file and the stored copy of the data file are error free and can be accessed by a requesting application.

8. The data resilience component as claimed in claim 1, wherein an imaginary line between the first sector and the second sector is collinear with a center point of the optical storage medium.

9. A method of providing data resilience of a data file to be stored, said method comprising the steps of:
creating a copy of a data file to be stored along a spiral information track of an optical storage medium having a first half and a second half, the first half and the second half being non-overlapping;

determining a number of sectors of the optical storage medium; and calculating, in dependence on the number of sectors determined, a number and location of redundant data bits required to space the copy of the data file from the data file when stored, such that the data file is stored in a first sector and the copy of the data file is stored in a second sector, the first and second sectors being non-adjacent and radially opposed to each other on the optical storage medium in that the first sector is located on the first half of the optical storage medium and the second sector is located on the second half of the optical storage medium.

10. A method as claimed in claim 9, wherein said calculating step further comprises creating a data stream comprising the data file, the copy of the data file and the redundant data bits for transmitting to an optical storage device for writing to the optical storage medium.

11. A method as claimed in claim 9, wherein the data file and the copy of the data file are separated by at least one sector on the optical storage medium.

12. A method as claimed in claim 9, wherein said calculating step further comprises calculating which sectors, through a complete revolution of the spiral information track, can store the data file and the copy of the data file without overlapping sectors.

13. A method as claimed in claim 9, said method further comprising the step of retrieving the data file, the copy of the data and the redundant data bits from the optical storage medium.

14. A method as claimed in claim 13, wherein said retrieving step further comprises extracting the data file and the copy of the data file from the optical storage medium and determining if the data file and/or the copy of the data file is operable.

15. A method as claimed in claim 14, wherein said retrieving step further comprises determining whether the data file and the copy of the data file are error free and can be accessed by a requesting application.

16. The method as claimed in claim 9, wherein an imaginary line between the first sector and the second sector is collinear with a center point of the optical storage medium.

* * * * *